United States Patent [19]
Cooper

[11] 3,950,292
[45] Apr. 13, 1976

[54] RESINOUS SOLUTION RADIAL BLOCK COPOLYMER/SOLUTION RUBBERY COPOLYMER BLEND

[75] Inventor: William T. Cooper, Bartlesville, Okla.

[73] Assignee: Phillips Petroleum Company, Bartlesville, Okla.

[22] Filed: Oct. 12, 1972

[21] Appl. No.: 296,847

[52] U.S. Cl. ...... 260/23.7 R; 261/23 R; 261/755 R; 217/86 B
[51] Int. Cl.² .......................................... C08L 91/00
[58] Field of Search ............ 260/23 R, 23.7 R, 27 R, 260/880 B, 79.5 R

[56] References Cited
UNITED STATES PATENTS 3,658,740  4/1972  Marrs ................................ 260/27 R
3,676,386  7/1972  Brenner ............................ 260/27 R

OTHER PUBLICATIONS

"Rubber Age" 1–1964, Vol. 94, No. 4, pp. 583–587.

*Primary Examiner*—M. J. Welsh
*Assistant Examiner*—William E. Parker

[57] ABSTRACT

A blend comprising (1) 5-60 parts by weight of a solution polymerized resinous radial block copolymer and (2) 100 parts by weight of a rubbery solution polymerized copolymer having 65–90 percent polymerized conjugated diene. Such blends have been found to possess outstanding flex life and good hardness making them of particular utility in applications such as shoe soles.

10 Claims, No Drawings

RESINOUS SOLUTION RADIAL BLOCK COPOLYMER/SOLUTION RUBBERY COPOLYMER BLEND

BACKGROUND OF THE INVENTION

This invention relates to solution polymerized resinous radial block copolymer blends.

It is well known to blend rubber with various resins to improve the impact strength of the resin. However, because of compatibility considerations and other factors not entirely understood such blends generally exhibit deterioration of other important properties or at best give properties which merely represent a compromise between the properties of the components. With shoe sole formulations there has been found an inverse relationship between flex life and hardness with changes in blend composition which helps one generally causing a deterioration in the other.

SUMMARY OF THE INVENTION

It is an object of this invention to provide a resinous radial block copolymer/rubbery solution copolymer blend;

It is a further object of this invention to provide a resinous radial block copolymer blend having good flex characteristics;

It is yet a further object of the invention to provide compositions having high hardness and outstanding flex characteristics; and It is still yet a further object of this invention to provide improved shoe sole compositions.

In accordance with the invention there is provided a blend comprising (1) 5–60 weight parts by weight of a solution polymerized resinous radial block copolymer and (2) 100 parts by weight a rubbery solution polymerized copolymer having a polymerized conjugated diene content of 65–90 percent.

DESCRIPTION OF THE PREFERRED EMBODIMENTS

The radial block copolymer of the instant invention can be any resinous polymer having at least three vinyl-substituted aromatic compound/conjugated diene block copolymer chains radiating from a central nucleus and produced in a hydrocarbon solvent. The word "resinous" is used in its conventional sense to denote a normally solid material not having elastic properties. Generally such materials will have a Shore D hardness (ASTM D 1706-61) of greater than 62, preferably greater than 69. Preparation of such radial polymers is broadly disclosed in Zelinski et al, U.S. Pat. No. 3,281,383 issued Oct. 25, 1966, the disclosure of which is hereby incorporated by reference, it being understood that the radial block copolymers of this component of this invention are limited to those having resinous characteristics. Resinous block copolymers having branches of polymer which demonstrate a plurality of modes on a gel permeation chromatograph curve prior to coupling as disclosed in Kitchen et al, U.S. Pat. No. 3,639,517, the disclosure of which is hereby incorporated by reference, are especially preferred.

The resinous radial block polymers of the first component of the blend of this invention can broadly be viewed as any radial conjugated diene vinyl-substituted aromatic compound block copolymer such as is prepared, for instance, by producing a block copolymer in the presence of an organolithium initiator to give a block copolymer containing an active lithium atom on one end of the polymer chain as more fully described in said Zelinski et al patent. This lithium-terminated copolymer is then reacted with a compound which has at least three reactive sites capable of reacting with the lithium-carbon bond and adding to the carbon possessing this bond in the polymer. The result is a polymer having relatively long branches which radiate from the nucleus formed by the polyfunctional compound which reacted with the lithium-terminated polymer. The preferred organolithium compound can be represented by the formula RLi where R is a hydrocarbon radical selected from the group consisting of aliphatic, cycloaliphatic, and aromatic radicals containing 1 to 20 carbon atoms, such as n-butyllithium.

Types of compounds having at least three reactive sites include polyepoxides, polyisocyanates, polyimines, polyaldlehydes, polyketones, polyanhydrides, polyesters, polyhalides, and the like.

These resinous solution polymerized radial block copolymers comprise 70 to 95 weight percent polymerized monovinyl-substituted aromatic hydrocarbon monomer containing from about 8 to 18 carbon atoms per molecule and from about 30-5 weight percent polymerized conjugated diene monomer containing from about 4 to 12 carbon atoms per molecule based on the total weight of the resinous block copolymer. The polymer preferably has a melt flow in the range of about 0.5 to 20.0 g/10 min. as determined by ASTM D 1238-65T, Condition G. The block copolymer branches can be uniform in molecular weight distribution or they can be prepared in a manner to give a polymodal molecular weight distribution within the branches, by charging the monovinyl-substituted aromatic hydrocarbon monomer in a plurality of increments as described in said Kitchen et al patent referred to hereinabove.

The rubbery solution copolymer which is the second component of the blend of this invention can be any normally solid copolymer of a conjugated diene having 4-12 carbon atoms per molecule with monovinyl-substituted aromatic hydrocarbon having from 8–18 carbon atoms per molecule, said copolymers must contain at least 65, preferably 65–90 weight percent of said conjugated diene and no more than 35, preferably 35–10 weight percent of said monovinyl-substituted aromatic hydrocarbon based on the total weight of the copolymer composition. More preferably the rubbery solution copolymers are random copolymers containing 70-80 weight percent of said diene, said diene being butadiene and said monovinyl-substituted aromatic compound being styrene. By rubber it is meant an elastomeric material that is capable of recovering from large deformations quickly and forcefully as defined by ASTM D 1566-62T. Such rubbery materials generally have a Shore D hardness (ASTM D 1706-61) of less than 60. These rubbery copolymers can be either essentially random or have a block configuration. They can be either essentially linear or can be branched or radial. These solution polymerized rubbery copolymers can be produced utilizing an alkali metal-based polymerization initiator and polymerized in a hydrocarbon solvent in accordance with procedures well known in the art. For instance, they can be produced in the manner disclosed in 7 Interscience, Encyclopedia of Chemical Technology, 684 (2d Ed., 1965). Both components can be produced in the manner broadly disclosed by said Zelinski et al patent with the first component being prepared under conditions which give a resinous product and the second under conditions which give a rubbery product.

The blends of the invention comprise 5–60, preferably 20–45 parts by weight of said resinous radial block copolymer per 100 parts by weight of said solution polymerized rubbery copolymer.

While the blend has been described hereinabove as having, for instance, 5–60 parts by weight resinous component per 100 parts by weight of said rubbery component, this is not to preclude the presence of conventional additives such as: fillers such as clay, silica, carbon black and the like; plasticizers and processing aids such as petroleum oils, fatty acids, waxes and the like; curatives such as sulfur, peroxides and the like; vulcanization activators and accelerators such as zinc oxide, stearic acid, carbamates, thiuram sulfides and the like; pigments; antioxidants and other stabilizers; and the like. Also, it is within the scope of the invention to utilize a blend of two or more resinous radial block copolymers in the first component and two or more solution polymerized rubbery copolymers in the second component.

The blend compositions of this invention find particular utility in shoe soles and shoe heels, floor mats and floor tile, cove base stock, wire coating, especially cords for small appliances, and the like where flex life is critical.

CONTROL I

A blend was compounded in a microcellular shoe sole recipe shown below. As control b, Component A of the blend was replaced in the recipe by a commercially available high styrene resin Pliolite S6B described in more detail below. The two compounded stocks were cured at 307°F and the properties of the vulcanized compounds measured.

Compound Recipe

|  | Parts, by weight |
|---|---|
| Component A[a] | 33 or 0 |
| Pliolite S6B[b] | 0 or 33 |
| Solprene 303[c] | 100 |
| Cumar MH 2½[d] | 4 |
| Silene EF[e] | 60 |
| Suprex Clay[f] | 13.3 |
| Circosol 42XH[g] | 2 |
| Zinc Oxide | 6.7 |
| Stearic Acid | 3.3 |
| Solka Floc BW 40[h] | 13.3 |
| Carbowax 6000[i] | 1.3 |
| AgeRite Superlite[j] | 1.3 |
| Red Iron Oxide | 1.3 |
| Yellow Iron Oxide | 3.3 |
| Unicel 100[k] | 2.1 |
| Altax[l] | 2 |
| Sulfur | 3.7 |

[a]A radial teleblock copolymer of butadiene/styrene (20/80) made according to the general procedures of U.S. 3,639,517 and having an elongation of 4% (ASTM D 412-66); a tensile of 1570 psi (ASTM D 412-66); a notched Izod impact strength of 0.89 ft. lbs./inch notch (ASTM D 256-56) and a Shore D Hardness of 69 (ASTM D 2240-68).
[b]Commercially available emulsion polymerized essentially random butadiene/styrene (18/82) copolymer having a sp. gr. of 1.05 and a softening point of 49°C.
[c]A commercially available solution polymerized random copolymer of butadiene styrene (52/48) having a raw Mooney viscosity of 45 ML-4 at 212°F (ASTM D 1646-63) and a density of 0.97.
[d]Cumarone - indene resin.
[e]Hydrated precipitated calcium silicate.
[f]Hydrated aluminum silicate (South Carolina hard clay).
[g]Naphthenic extender oil derived from petroleum.
[h]Wood cellulose, 90% passes 100 mesh and of specific gravity of 1.58.
[i]Polyethylene glycol having an average molecular weight of about 6000.
[j]Polybutylated 4,4'-isopropylidenediphenol.
[k]N,N'-Dinitrosopentamethylene tetramine, 99.5% passes 100 mesh.
[l]2,2'-Dibenzothiazyl disulfide.

Physical Properties

|  | Control a | Control b |
|---|---|---|
| Cure times, minutes | 9 | 11 |
| Density, g/cc | 0.61 | 0.70 |
| Compression Set, %[a] | 4.9 | 4.7 |
| Split Tear Strength, lb/in.[b] | 13.2 | 20.2 |
| Hardness, Shore A[c] | 76 | 82 |
| Hardness, Shore D[c] | 27 | 35 |
| Ross Flex Life, M[d] | 4.8 | 1.2 |
| NBS Abrasion, rev./mil[e] | 0.28 | 0.36 |

[a]Measured on 1¼ × ¾ in. blocks compressed 35% for 70 hours at room temperature in compression set molds.
[b]Measured on Scott CRE tensile test machine at a rate of 2 inches/minute using ½ × 5 inch tensile slab. Samples are split on the edge for 1½ inches and then pulled on the tensile machine.
[c]ASTM D 2240-68.
[d]ASTM D 1052-55. Reported as thousands of flexures to 0.60 inch crack length.
[e]ASTM D 1630. Employing No. 30 grit, 2½ garnet paper as the abrasive paper.

The above results show that the Control run a employing radial block resinous component produced a compound having higher flex life than the Control rub b which employed the emulsion polymerized high styrene resin. However, this was achieved through the expected decrease in hardness. Also, abrasion was slightly inferior.

EXAMPLE I

Two other runs were made in which a blend of the invention was compared with a control blend which again employed the emulsion polymerized high styrene resin used in Control b. The shoe sole recipe employed in these runs is shown below.

Compound Recipe

|  | Parts, by weight |
|---|---|
| Component A[a] | 30 or 0 |
| Pliolite S6B | 0 or 30 |
| Component B[b] | 100 |
| Hi Sil 233[c] | 60 |
| Dixie Clay[d] | 15 |
| Zinc Oxide | 5 |
| Stearic Acid | 2 |
| Cumar MH 2½* | 10 |
| Circolite Oil[e] | 5 |
| Diethylene glycol | 3 |
| AgeRite Superlite | 1.5 |
| Altax | 1.75 |
| Diphenylguanidine | 0.75 |
| Sulfur | 3 |

*See footnotes in Control for materials not defined here
[a]A radial teleblock copolymer of butadiene/styrene (25/75) made according to the general procedures of U.S. 3,281,383.
[b]A commercially available solution polymerized random copolymer of butadiene/styrene (75/25) having a raw Mooney viscosity 56 ML-4 212°F and a density of 0.93.
[c]Hydrated silica pigment of extremely fine particle size.
[d]A hard-type, white-to-cream colored kaolin mineral filler (aluminum silicate).
[e]Light gold colored oil having a sp. gr. of about 0.92 and a Saybolt viscosity of about 155 seconds at 100°F.

The compounds were mixed in an internal mixer (BR Banbury) and cured for 30 minutes at 307°F. The properties of the cured compounds are shown below.

Physical Properties

|  | Run 1 (Invention) | Control c |
|---|---|---|
| Compression set, %[a] | 34 | 28 |
| 300% Modulus, psi[b] | 1180 | 1160 |
| Tensile, psi[b] | 2885 | 2880 |
| Crescent Tear, lb./in. at 80°F[c] | 230 | 250 |
| NBS Abrasion, rev./mil[d] | 9.55 | 3.02 |
| Shore A Hardness[e] | 93 | 94 |

Physical Properties-continued

|  | Run 1 (Invention) | Control c |
|---|---|---|
| Ross Flex Life, M | 0.42[w] | 70.0[f] |

[a]ASTM D 395-61 Method B modified by employing a heat treatment period of 2 hours at 212°F and an aftertreatment (relaxation) period of 1 hour at 212°F.
[b]ASTM D 412-66.
[c]ASTM D 624-54 Die A.
[d]ASTM D 1630. Employing No. 30 grit, 2½ garnet paper as the abrasive paper.
[e]ASTM D 2240-68 Shore Durometer Type A.
[f]ASTM D 1052-55 Reported as thousands of flexures to 0.60 inch crack length.
[w]Crack growth (inches) at 100,000 flexures.

The results above demonstrate that the blend of the invention (using a rubber of higher diene content) provided a compound with much higher Ross Flex life, abrasion resistance and essentially equal hardness compared to the control run employing an emulsion polymerized high styrene resin. The flex life for the control is reported in terms of thousands of flexures for 0.6 inch crack length since the test was stopped at that point. The invention is reported in crack length per 100,000 flexures because it had not yet reached 0.6 inch at that level of flexures. Thus it can be seen that blends of essentially the same hardness can be obtained as those of the control yet having less than 0.6 inch crack length after 100,000 flexures.

EXAMPLE II

Three other runs were carried out employing essentially the same compounding recipe as in Example I with the exception that Hi Sil 233 was replaced by Hi Sil 210, a very similar material. Also, the two runs according to the invention and the control run employed the same Component B that was employed in Example I. The control run (Control d) employed the same emulsion polymerized high styrene resin used in Control runs b and c. Run 2 (of the invention) employed as Component A a radial teleblock copolymer of butadiene/styrene (15/85) made according to the general procedures of U.S. Pat. No. 3,281,383 while Run 3 (of the invention) employed as Component A a radial teleblock copolymer of butadiene/styrene (25/75) made according to the general procedures of U.S. Pat. No. 3,281,383. The compounded stocks were mixed in an internal mixer and cured for 30 minutes at 307°F. The physical properties obtained according to the procedures of Example II are shown below.

Physical Properties

|  | Run No. 2 (Invention) | 3 (Invention) | Control d |
|---|---|---|---|
| Compression set, % | 24.7 | 28.4 | 23.7 |
| 300% Modulus, psi | 1365 | 1260 | 1305 |
| Tensile, psi | 2640 | 2750 | 2720 |
| Crescent Tear, lb./in. | 245 | 245 | 260 |
| NBS Abrasion, rev./mil | 3.07[a] | 2.86[a] | 2.67[a] |
| Shore A Hardness | 92 | 90 | 91.5 |
| Ross Flex Life, in.[b] | 0.43[a] | 0.39[a] | 0.54[a] |

[a]Samples cured 20 minutes.
[b]Crack growth at 100,000 flexures.

As in Example I the results demonstrate that the blends of the invention provide compounded stocks of near equal hardness, but higher abrasion resistance and longer Ross Flex life than the control blend.

EXAMPLE III

Three other runs were carried out employing the same compounding recipe of Example II. Control e of the instant example was a duplicate of Control d of Example II and Run 5 of the instant example was a duplicate of Run 3 (invention) of Example II. Run 4 of the instant example employed as Component A a radial teleblock copolymer of butadiene/styrene (20/80) made according to the general procedures of U.S. Pat. No. 3,639,517. The compounded stocks were mixed as before and cured for 30 minutes at 307°F. The physical properties obtained according to the procedures of Example II are shown below.

Physical Properties

|  | Run No. 4 (Invention) | 5 (Invention) | Control e |
|---|---|---|---|
| Compression set, % | 30.5 | 28.5 | 27.4 |
| 300% Modulus, psi | 1100 | 1140 | 1070 |
| Tensile, psi | 2830 | 3030 | 2780 |
| NBS Abrasion, rev./mil | 3.1[a] | 3.1[a] | 3.0[a] |
| Shore A Hardness | 91[a] | 90[a] | 94[a] |
| Ross Flex Life, in.[b] | 0.27 | 0.50 | 0.53 |

[a]Samples cured 20 minutes.
[b]Crack growth at 100,000 flexures.

The results again demonstrate the runs of the invention provided compounded stocks of improved Ross Flex life and abrasion resistance compared to the control.

EXAMPLE IV

Additional shoe sole recipes were prepared to compare the different effect produced by blending the solution radial resinous polymers of the invention with solution polymerized rubber as contrasted with the same resin in emulsion polymerized rubber.

|  | Run 6 (Invention) | Control f | Control g | Control h |
|---|---|---|---|---|
| Component A[a] | 30 | — | 30 | — |
| Pliolite S6B[b] | — | 30 | — | 30 |
| Component B[c] | 100 | 100 | — | — |
| SBR 1502[d] | — | — | 100 | 100 |
| Compounded ML-4 at 212°F | 112 | 90 | 75 | 65 |
| Rheometer, 95% cure, min. | 41 | 40 | 24 | 30 |

Physical Properties Cured

| 300% Modulus, psi[e] | 1180 | 1160 | 930 | 1030 |
|---|---|---|---|---|
| Tensile, psi[e] | 2890 | 2880 | 2950 | 2790 |
| Elongation, %[e] | 640 | 630 | 600 | 560 |
| Shore A hardness[f] | 93 | 93 | 87 | 90 |
| Ross Flex Life, M[g] | 0.42[h] | 70 | 20 | 10 |
| NBS Abrasion, Rev./mil[i] | 9.6 | 3.0 | 3.0 | 2.5 |

[a]a radial teleblock copolymer of butadiene/styrene (25/75) made according to U.S. 3,281,383.
[b]commercially available emulsion polymerized essentially random butadiene/styrene (18/82) copolymer having a sp. gr. of 1.05 and a softening point of 49°C.
[c]a commercially available solution polymerized random copolymer of butadiene/styrene (75/25) having a raw Mooney viscosity 56 ML-4 at 212°F and a density of 0.93.
[d]a commercial emulsion polymerized rubbery butadiene/styrene (77/23) copolymer having a raw Mooney viscosity of about 52 ML-4.
[e]ASTM D 412-66.
[f]ASTM D 2240-68 Shore Durometer Type A.
[g]ASTM D 1052-55 Reported as thousands of flexures to 0.6 inch crack length.
[h]crack growth (inches at 100,000 flexures).
[i]ASTM D 1630, employing No. 30 grit, 2½ garnet paper as the abrasive.

These data show that, while the radial resinous solution polymer of the invention (Component A) gives better flex life and abrasion resistance as compared with an emulsion resinous polymer in all cases, only with a solution polymerized rubbery component (Component B) is this accomplished without a sacrifice in hardness.

Another series of runs gave the following results.

|  | Run 7 (Invention) | Control i | Control j | Control k |
|---|---|---|---|---|
| Component A[a] | 30 | — | 30 | — |
| Pliolite S6B | — | 30 | — | 30 |
| Component B[b] | 100 | 100 | — | — |
| SBR 1502 | — | — | 100 | 100 |
| Shore D hardness | 41 | 42 | 36 | 37 |
| Ross Flex Life, M | 0.43[c] | 0.54[c] | 16 | 19 |
| NBS Abrasion, Rev./mil | 3.1 | 2.7 | 3.1 | 2.7 |

[a]15/85 butadiene/styrene solution polymerized radial block resinous copolymer.
[b]solution polymerized rubbery random copolymer of 75/25 butadiene/styrene
[c]crack length after 100,000 flexures, inch.

While this invention has been described in detail for the purpose of illustration it is not to be construed as limited thereby but is intended to cover all changes and modifications within the spirit and scope thereof.

I claim:

1. A solid polymeric blend comprising: (1) a resinous solution polymerized radial block copolymer comprising 70–95 weight percent of a polymerized monovinyl-substituted aromatic compound containing 8–18 carbon atoms per molecule and 30 to 5 weight percent of a conjugated diene containing 4 to 12 carbon atoms per molecule; and (2) a solution polymerized rubbery copolymer of 65–90 weight percent of a conjugated diene and 35-10 weight percent of a monovinyl-substituted aromatic compound, said resinous radial block copolymer being present in an amount within the range of 5–60 parts by weight per 100 parts by weight of said solution polymerized rubbery copolymer.

2. A composition according to claim 1 wherein said solution polymerized rubbery copolymer is a polymer of butadiene and styrene and said resinous radial block copolymer is a copolymer of butadiene and styrene.

3. A composition according to claim 2 wherein said solution polymerized rubbery copolymer is a random copolymer having 70–80 weight percent butadiene.

4. A composition according to claim 2 wherein said blend comprises 20–45 parts by weight of said resinous block copolymer per 100 parts by weight of said solution polymerized rubbery copolymer.

5. A composition according to claim 2 wherein said resinous radial block copolymer is prepared utilizing a single addition of said styrene.

6. A composition according to claim 2 wherein said resinous radial copolymer is prepared utilizing multiple additions of said styrene.

7. A composition according to claim 2 in the form of a shoe sole.

8. A cured composition according to claim 2 wherein said solution polymerized copolymer is a random copolymer containing 70–80 weight percent of said butadiene, said blend having a Ross Flex life of less than 0.6 inch crack length per 100,000 flexures.

9. A composition according to claim 8 wherein said composition contains at least one filler and sulfur as a curing agent.

10. A composition according to claim 8 wherein said composition contains a hydrated silica pigment, a kaolin mineral filler, zinc oxide, stearic acid, a cumarone-indene resin, an oil, diethylene glycol, a polybutylated 4,4'-isopropylidenediphenol 2,2'-dibenzothiazyl disulfide, diphenylguanidine and sulfur.

* * * * *